United States Patent [19]
Jiao et al.

[11] Patent Number: 5,197,792
[45] Date of Patent: Mar. 30, 1993

[54] ILLUMINATOR DEVICE FOR A DISPLAY PANEL

[75] Inventors: Jianzhong Jiao; Jeffrey J. Calderas, both of Anderson, Ind.

[73] Assignee: General Motors Corporation, Detroit, Mich.

[21] Appl. No.: 871,789

[22] Filed: Apr. 21, 1992

[51] Int. Cl.⁵ .............................................. F21V 5/00
[52] U.S. Cl. ........................................ 362/31; 362/30; 362/327; 362/330; 362/331
[58] Field of Search ........................ 362/23, 26, 29, 30, 362/31, 327, 328, 329, 330, 331, 332, 339, 346, 297; 340/815.17

[56] References Cited

U.S. PATENT DOCUMENTS

| | | | |
|---|---|---|---|
| 3,716,710 | 2/1973 | Clostermann et al. | 362/339 |
| 4,368,504 | 1/1983 | Sato et al. | 362/330 |
| 4,737,896 | 4/1988 | Mochizuki et al. | 362/23 |
| 4,984,144 | 1/1991 | Cobb, Jr. et al. | 362/329 |

FOREIGN PATENT DOCUMENTS

0399502A2 5/1990 European Pat. Off.

Primary Examiner—Ira S. Lazarus
Assistant Examiner—Y. Quach
Attorney, Agent, or Firm—Anthony Luke Simon

[57] ABSTRACT

A device for providing large area uniform illumination of display panels comprises a light transmitting member including a light receiver for receiving light from a light source and reflecting that light within the light transmitting member in at least a first direction parallel to a first axis and parallel to the plane of the light transmitting member. A plurality of first reflectors reflect a first portion of the light from the first direction to an exit direction orthogonal to the plane of the light transmitting member and reflect a second portion of the light from the first direction to a second direction parallel to the plane of the light transmitting member and parallel to a second axis that is perpendicular to the first axis. A plurality of second light reflectors reflect the light from the second direction to the exit direction.

24 Claims, 4 Drawing Sheets

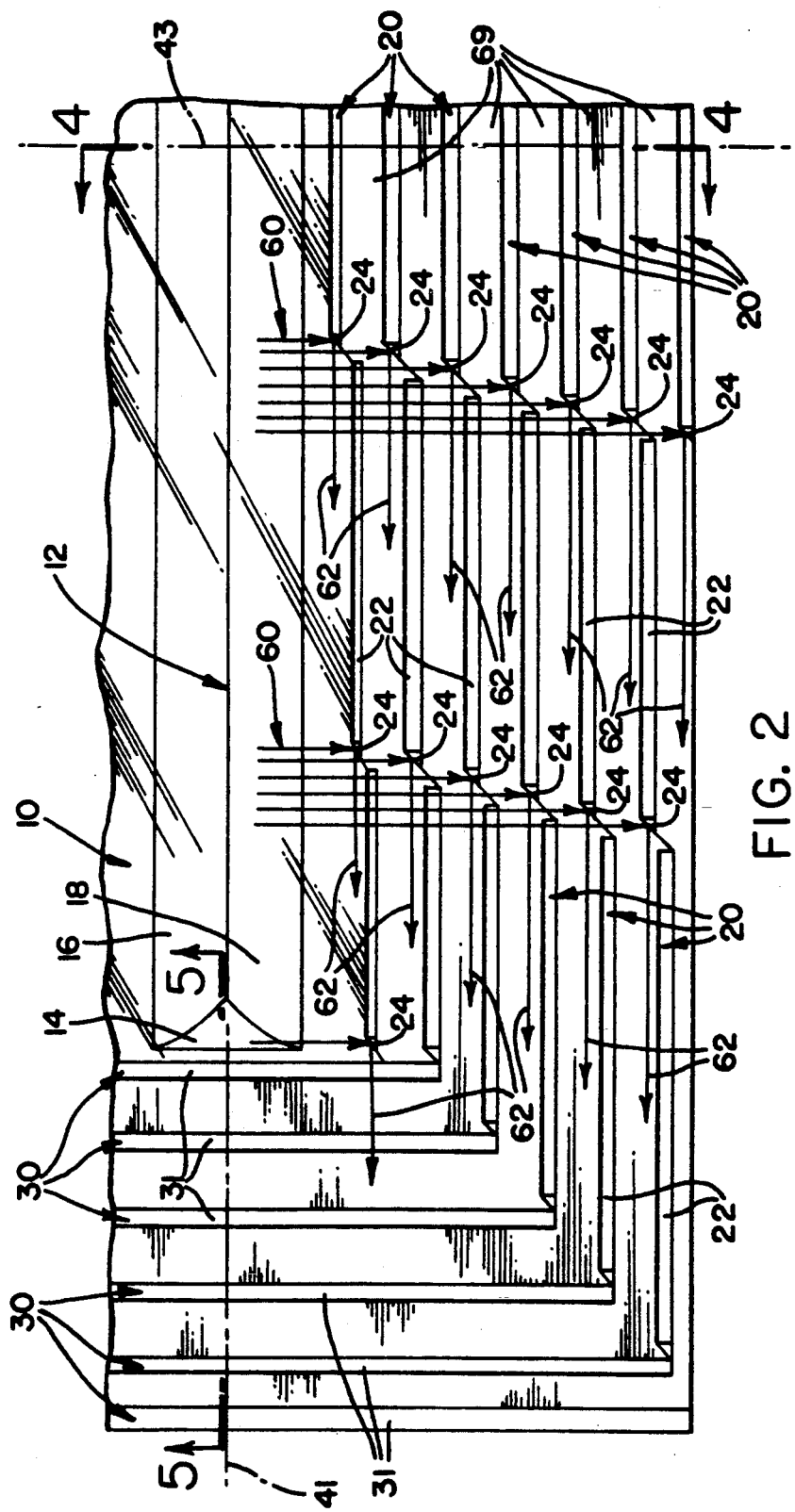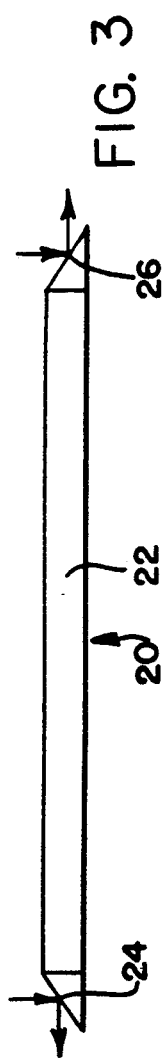
FIG. 2
FIG. 3

ILLUMINATOR DEVICE FOR A DISPLAY PANEL

This invention pertains to illuminated panel displays of a type suitable for use in motor vehicles.

BACKGROUND OF THE INVENTION

Typically, automotive vehicles include instrument clusters comprising panels of displays of telltales, gauges and general information. The displays are generally illuminated, especially for night time driving, to be visible to the vehicle operator. General characteristics desired in illuminated display panels include uniformity of the lighting, back-lighting, and convenient placing of the light source so as not to interfere with the appearance of the panel.

In some displays, fluorescent tube lights shaped to match the shape of the surface of the display desired to be illuminated are placed behind the display for back-lighting. However, fluorescent displays can be costly and are relatively bulky.

What is desired is an improved illuminated display, especially a back-lit display, that provides uniform lighting characteristics.

SUMMARY OF THE INVENTION

This invention provides a panel illuminator for a display panel capable of illuminating the display panel over large areas either from behind or in front of the display panel. The panel illuminator of this invention is capable of providing large, uniformly-lit areas with a minimum thickness and bulk. The large area uniform lighting provided by this invention simulates the lighting achieved by fluorescent tube light sources.

Structurally, this invention comprises a light transmitting member including means for receiving light from a light source and reflecting that light within the light transmitting member so that the light travels within the light transmitting member parallel to a plane of the light transmitting member. Also included is a plurality of first reflecting means that receive the parallel light in a first direction parallel to a first axis. Each first reflecting means comprises at least one first reflecting surface for reflecting the parallel light of the first direction into an exit direction orthogonal to the plane of the light transmitting member and at least one second reflecting surface for reflecting the parallel light of the first direction into a second direction parallel to a second axis, the second axis parallel to the plane of the light transmitting member and orthogonal to the first axis. Also included within the light transmitting member are a plurality of second light reflecting means. Each second light reflecting means comprising a third reflective surface for reflecting the light in the second direction into the exit direction.

A more detailed description of this invention, along with various embodiments thereof, as set forth below.

BRIEF DESCRIPTION OF THE DRAWINGS

FIG. 2 is a view of a portion of the panel illuminator shown in FIG. 1.

FIG. 3 is another view of a portion of the panel illuminator.

DETAILED DESCRIPTION OF THE INVENTION

Figure 1:
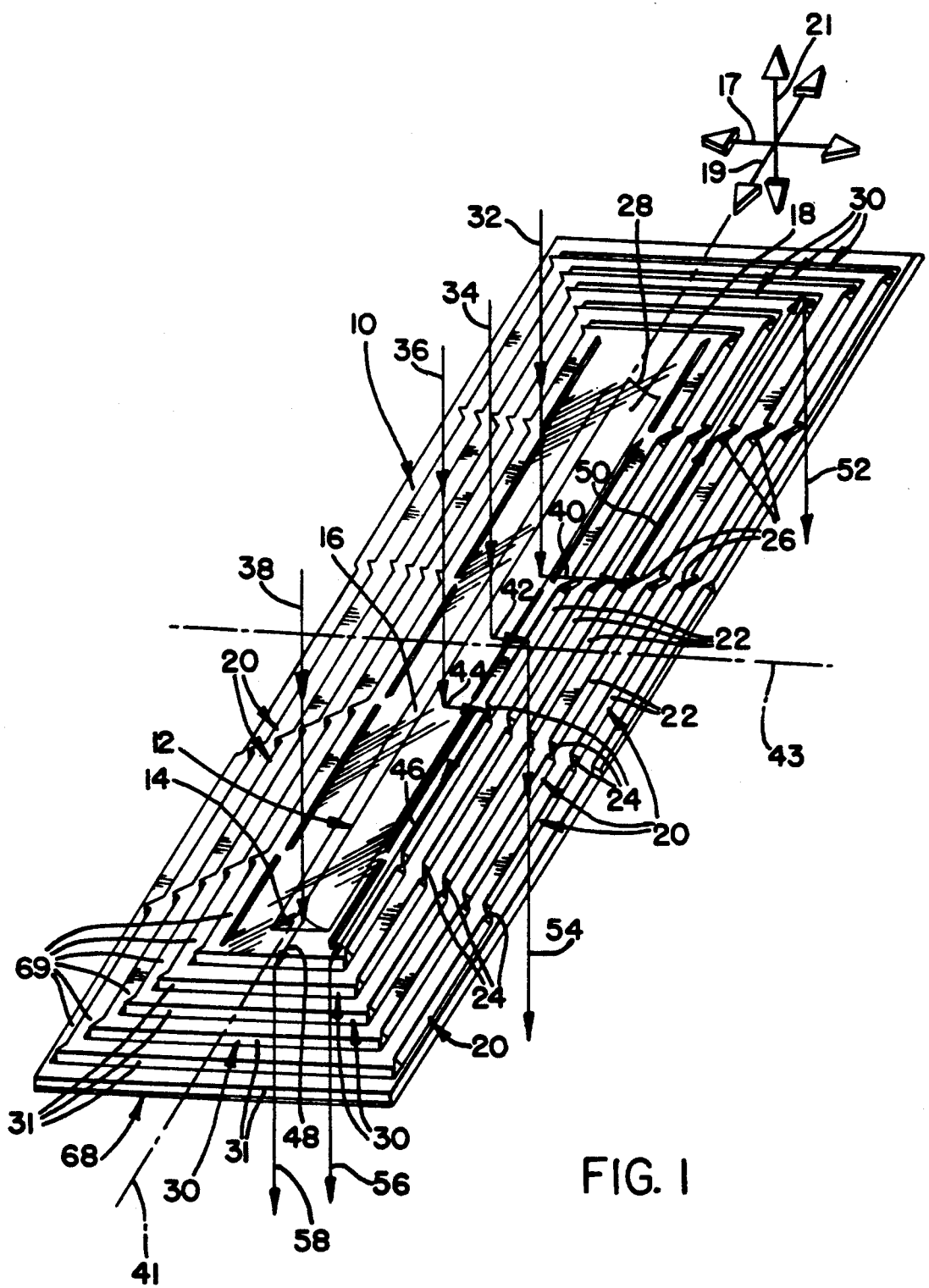
FIG. 1 is an illustration of the panel illuminator of this invention.

Referring to FIG. 1, the illuminator panel of this invention is shown comprising light transmitting member 10, which is a single piece molded from a light transmitting substance, such as a clear plastic of the type commonly used by those skilled in the art of the manufacture of light pipes, with the shown features integrally constructed therein. The light transmitting member 10 has an inner reflector 12 comprising means for receiving light from a light source (not shown) generally in the direction of arrows 32, 34, 36 and 38, which are perpendicular to the plane of the light transmitting member 10.

The reflector 12 comprises reflective surfaces 14, 16, 18 and 28 that reflect the light received from the light source (not shown) directing the light so that it travels within the light transmitting member 10 parallel to the plane of the light transmitting member 10. The reflective surfaces 16 and 18 reflect the incoming light in a first direction parallel to first axis 17 that is parallel to the plane of the light transmitting member 10. Arrows 40, 42 and 44 represent light reflected in the first direction from reflecting surface 18.

Reflective surfaces 14 and 28 reflect the incoming light so that it travels within the light transmitting member 10 in a second direction parallel to second axis 19, which is orthogonal to first axis 17 and is parallel to the plane of the light transmitting member 10. Arrow 48 represents a ray of light reflected off of reflecting surface 14 in the second direction.

The light transmitting member 10 comprises a plurality of first reflecting means 20 for reflecting light from the first direction within the light transmitting member 10 both out of the light transmitting member 10 and to the second direction within the light transmitting member 10. Each first reflecting means 20 comprises a first reflecting surface 22, which receives a first portion of the light traveling in the first direction within the light transmitting member 10 and reflects the first portion of light into an exit direction 21 orthogonal to the plane of light transmitting member 10, towards planar exit surface 68 (the underside surface of the view shown) and out of the light transmitting member 10. The light reflected off of one of the first reflecting surfaces 22 and exiting the light transmitting member 10 is represented by arrow 54.

Each first reflecting means 20 also comprises at least one second reflective surface 24 or 26. Each second reflective surface 24, 26 receives a second portion of the light within light transmitting member 10 traveling in the first direction and reflects the second portion of light into the second direction, which is parallel to second axis 19. Arrows 46 and 50 represent light reflected off of the second reflective surfaces 24 and 26.

The light propagating in the second direction within the light transmitting member 10 also comprises the light, such as the light 48, reflected off of surface 14 and light similarly reflected off of surface 28. The light traveling in the second direction within the light transmitting member 10 travels until it meets one of the plurality of second light reflecting means 30. Each of the second light reflecting means 30 comprises a third reflective surface 31 that reflects the light from the second direction to the exit direction 21 towards planar exit surface 68, thereby reflecting the light out of the light transmitting member 10 as represented by arrows 52, 56 and 58, which exit the light transmitting member 10 at surface 68.

Referring to FIG. 2, a view of a quarter of the light transmitting member 10 shown in FIG. 1 shows rays of light 60 traveling in the first direction parallel to the plane of the light transmitting member 10. A plurality of first light reflecting means 20 are shown containing second light reflecting surfaces 24, which reflect the second portion of light to the second direction, as represented by arrows 62.

FIG. 3 shows an example first reflecting means 20, which includes reflecting surfaces 22, 24, and 26.

Figure 4:
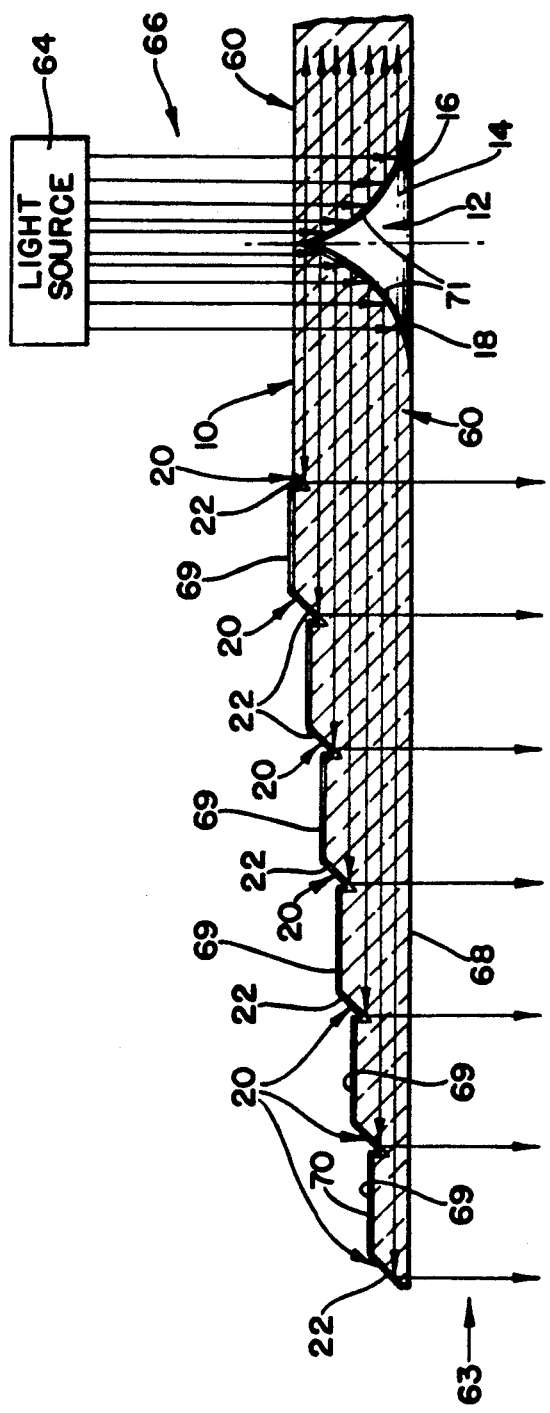
FIG. 4 is an illustration of the cross-section 4—4 of the view shown in FIG. 2.

FIG. 4 shows the cross-section of light transmitting member 10 taken along cut-out 4—4 of the view in FIG. 2. The cross-section includes reflector 12 and reflective surfaces 16 and 18 and shows light source 64.

Light from the light source 64 represented by arrows 66 traveling orthogonal to the plane of the light transmitting member 10, enters light transmitting member 10 and is reflected off of surfaces 16 and 18 as shown. The light reflected off of surfaces 16 and 18 travels parallel to the plane of the light transmitting member 10 in the first direction as represented by arrows 60. A first portion of the light travels through the light transmitting member 10, as shown, to reflect off of the first reflecting surfaces 22 of the first reflecting means 20 to travel in the exit direction of light rays 63 out of the light transmitting member 10 at surface 68.

The cross-section shown in FIG. 4 clearly illustrates the step-wise nature of the light transmitting member 10 and the disposition of the plurality of first light reflecting means 20 in planes parallel to one another and parallel to the plane of the light transmitting member 10. The cross-section of FIG. 4 also clearly illustrates how the panel illuminator of this invention illuminates a large area of a display panel from a relatively compact light source 64.

In certain implementations where it is not necessary for light transmitting member 10 to be transparent all of the way through and where it is desired to protect the reflective surfaces and the surfaces opposite surface 68, metalization layer 70 is vacuum metalized and sealed onto the light transmitting member 10, except at portions through which the light is received from the light source 64 and except at exit surface 68. The metalization layer 70 is optional and provides protection for the various surfaces when applied.

In addition to the optional vacuum metalization of the other reflective surfaces, reflector 12 may optionally be vacuum metalized (reference 71), increasing the internal reflectivity provided by reflector 12, and thereby increasing the intensity of the light exiting light transmitting member 10 through exit surface 68. In any case, neither the portion of light transmitting member 10 through which light is received nor the surface 68 is vacuum metalized. A suitable example includes vacuum metalization of reflector 12 and all of the other reflective surfaces, while omitting vacuum metalization of the parallel planar back surfaces 69 and exit surface 68.

Figure 5:
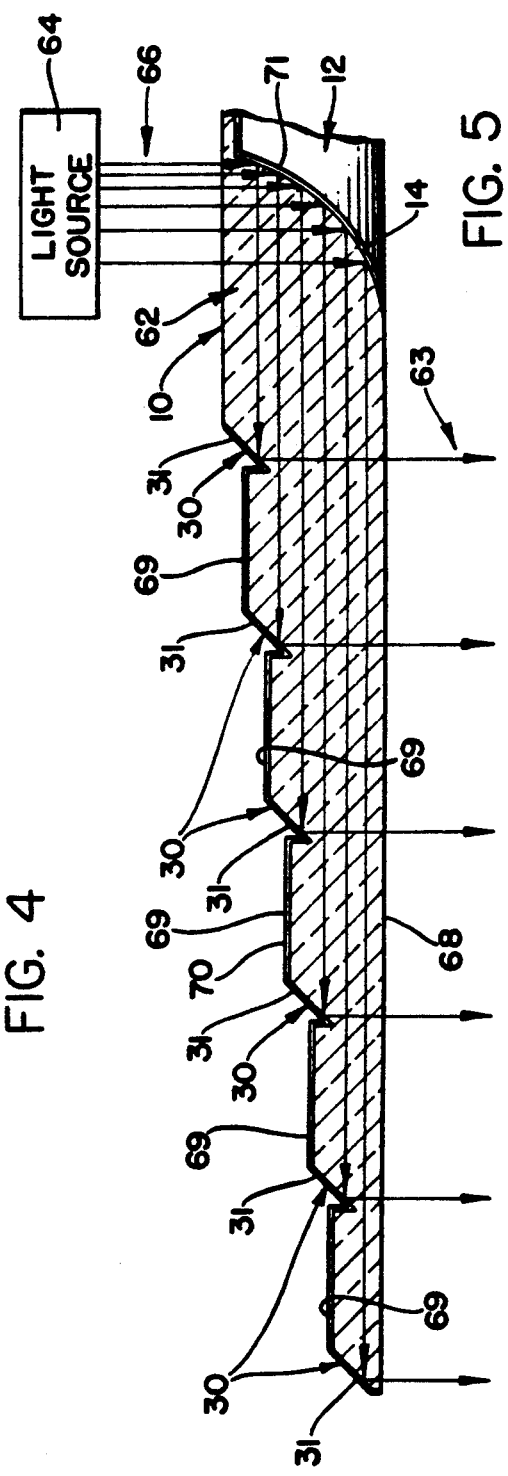
FIG. 5 is another view of a portion of the panel illuminator shown in FIG. 1, taken generally along the plane indicated by lines 5—5 in FIG. 2.

Referring to FIG. 5, the cross-section 5—5 of the view shown in FIG. 2 includes a plurality of the second light reflecting means 30 and a cross-sectional view of the reflective surface 14. The light 66 traveling from light source 64 enters light transmitting member 10 and reflects off of surface 14 in the second direction parallel to the plane of the light transmitting member as represented by arrows 62. The light then travels through the light transmitting member 10 in the direction of arrows 62 to reflect off of the plurality of second reflecting means 30, comprised of the third reflective surfaces 31 that reflect the light into the exit direction as represented by arrows 63 and out of the light transmitting member 10 at surface 68. The second reflecting means 30 are disposed similarly to the first reflecting means 20 in a step-wise manner in adjacent planes parallel to the plane of the light transmitting member 10.

The light source 64 described above may be any suitable light source, such as one or more incandescent bulbs either alone or in combination with reflectors to reflect the light in the direction 66. Light source 64 may also comprise a fluorescent or neon tube light source (in a straight or curved configuration), a set of LEDs, an HID (High Intensity Discharge) light source, or any other suitable type of light source. Optionally, the light source 64 may be placed in a remote location and the light generated therefrom transmitted to the panel illuminator through conventional light piping techniques or fiber-optic transmission so that the light enters the light transmitting member 10 in the direction of arrows 66. The panel illuminator shown above may be used in an instrumentation display panel such as those commonly used in automotive vehicles to provide uniform illumination of a large surface area with minimum volume packaging.

Referring again to FIG. 1, the preferred implementation shown therein has a pyramidal nature due to the stepwise construction, including the plurality of planar back surfaces 69, which are parallel to one another and decreasing in size as they are further removed from surface 68. The planar back surfaces 69 are connected by the plurality of first, second and third reflecting surfaces 22, 24 (and 26), and 31. Preferably, the first and third reflecting surfaces are each at 45 degrees to the planar back surfaces 69 and the second reflecting surfaces are perpendicular to the planar back surfaces 69.

The inner reflector 12, comprising the light receiver (or a top planar surface opposite the reflective surfaces, 16, 18), is located at the first center line 41, about which the light transmitting member 10 is preferably symmetrical in the first direction 17. The light transmitting member 10 is also preferably symmetrical in the second direction 19 about the second center line 43.

Figure 6:
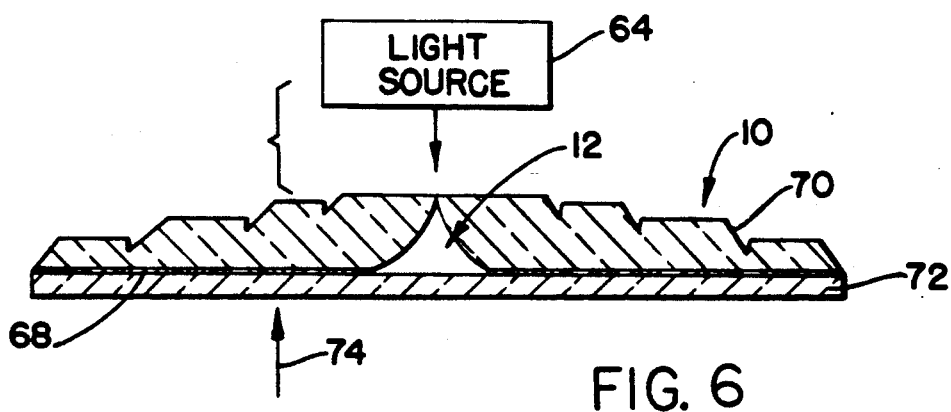
FIG. 6 is a view of an illuminated panel according to this invention.

Referring to the implementation of the invention shown in FIG. 6, light source 64 is disposed proximal to the inner reflector 12. A translucent display panel 72, to be back-lit and of a type well known to those skilled in the art, is disposed proximal to the surface 68 of the light transmitting member 10. The display shown is viewed from the direction of arrow 74 and when light source 64 is illuminated, display panel 72 provides a uniformly illuminated brightly back-lit display.

Figure 7:
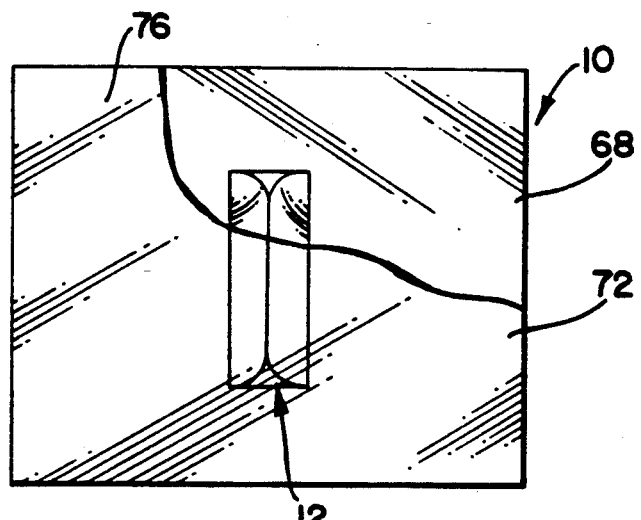
FIG. 7 is an illustration of the areas of the panel in FIG. 6 that may be illuminated by this invention.

FIG. 7 shows a front view of panel 72 and an example of the large area 76 of lighting achievable by this invention. In the event that inner reflector 12 is vacuum metalized, the portion of the panel 72 in front of reflector 12 is not illuminated. However, when reflector 12 is not vacuum metalized, the portion of the panel 72 in front of reflector 12 is illuminated.

Figure 8:
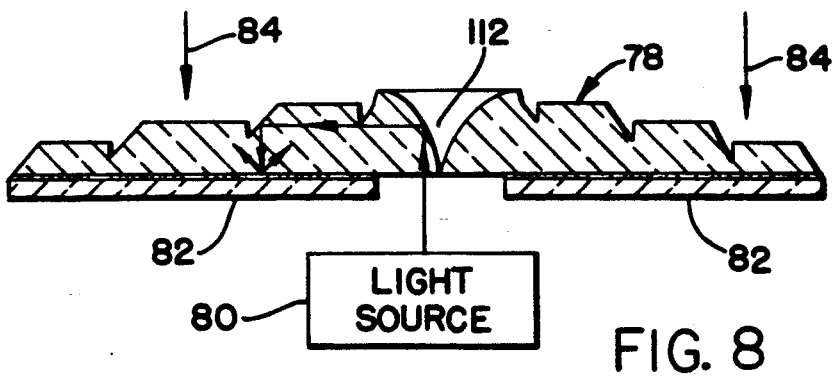
FIG. 8 is an illustration of an alternative implementation of this invention.

Referring to FIG. 8, the combination shown includes an alternative implementation of the panel illuminator of this invention, member 78, disposed between the viewer, who looks in the direction of arrows 84, and the graphics panel 82, which is front-lit. Light from light source 80 is reflected by inner reflector 112, which is constructed in the illuminator panel 78 in a manner opposite that of inner reflector 12 in FIG. 1. The light is reflected in a direction parallel to the plane of member 78 until it contacts one of either the first or second reflecting means (e.g., references 20 and 30, FIG. 1), which reflects the light toward display panel 82. Display panel 82 comprises a generally opaque panel with graphic characters disposed thereon in a manner well known to those skilled in the art. The display panel 82 is thereby illuminated to be viewed by an operator looking in the direction of arrows 84 to see the lit panel through the substantially transparent panel illuminator 78. In this manner, this invention is used in a front-lit display. In the implementation shown in FIG. 8, the metalization layer is omitted.

In the above described implementations of this invention, the internal reflector 12 acting as the light receiver is centrally located in the light transmitting member 10. In certain implementations, it may be desirable to locate the light receiver at a side of the light transmitting member. An example implementation in which the light receiver is at the side of the light transmitting member is a light transmitting member comprising only the portion of light transmitting member 10 (FIG. 1) to one side of the center line 41.

In the apparatus of this invention, the first and second reflecting means 20 and 30 are optimized such that the reflective surfaces do not cause shadows or cause overlapping of light. The structure of this invention shown in the Figures and described above provides such an optimized configuration. The depths of the grooves at the base of each reflecting surface 22 in FIG. 4 and the dimensions of the reflective surfaces are optimized to correspond with the lighting requirements of the specific implementation and the manufacturing process used. For example, the number of reflecting surfaces can be drastically increased and the size of each reflecting surface can be drastically reduced if a diamond machining process is used.

The internal reflector 12 acting as the light receiver may vary from the reflector described above, depending upon the light source used. For example, the internal reflector 12 shown is ideal for a light source such as a straight fluorescent tube. Internal reflector 12 can be easily optimized by those skilled in the art to account for lighting characteristics of other types of light sources.

In addition to the above described implementations of this invention, this invention may be used within an automotive vehicle in a dome lamp application, in other automotive vehicle interior or exterior lighting applications, or in non-automotive lighting applications.

Various other improvements and modifications to this invention may occur to those skilled in the art and those improvements or modifications will fall within the scope of this invention as set forth below.

We claim:

1. An apparatus comprising a light transmitting member including:

means for receiving light from a light source and reflecting that light within the light transmitting member in at least a first direction parallel to a first axis and parallel to a plane of the light transmitting member;

a plurality of first reflecting means for reflecting a first portion of the light from at least the first direction into an exit direction orthogonal to the plane of the light transmitting member and for reflecting a second portion of the light from the at least first direction into a second direction parallel to the plane of the light transmitting member and parallel to a second axis that is perpendicular to the first axis, wherein each of the plurality of first reflecting means includes at least a first reflecting surface for reflecting light into the exit direction and at least a second reflecting surface reflecting light into the second direction; and a plurality of second light reflecting means for reflecting the light from the second direction to the exit direction, the second light reflecting means comprising a third reflective surface.

2. The apparatus set forth in claim 1 comprising a first surface through which the light reflected in the exit direction from a second surface, the second surface opposite the first surface and comprising a metalization layer.

3. The apparatus set forth in claim 2 also comprising a translucent graphics plate mounted on the first surface, providing a uniformly back-lit display.

4. The apparatus set forth in claim 1 also comprising an opaque panel mounted to a first surface of the light transmitting member to provide a front-lit display.

5. The apparatus set forth in claim 1 wherein the means for receiving light comprises two surfaces that reflect light in opposite directions within the light transmitting member.

6. The apparatus set forth in claim 1 wherein the means for receiving light has a center-line and the light transmitting member is symmetrical with respect to the center line.

7. The apparatus set forth in claim 1 wherein the light transmitting member is implemented in a display to provide simulated fluorescent lighting of the display.

8. The apparatus set forth in claim 1 wherein the light transmitting member is implemented in a display to provide a large uniformly illuminated area of the display.

9. The apparatus set forth in claim 1 also comprising a light source mounted proximal to the means for receiving light.

10. The apparatus set forth in claim 9 wherein the light source comprises at least one incandescent bulb.

11. An apparatus comprising a light transmitting member, including:

a substantially planar exit surface;

a plurality of planar back surfaces integrally constructed into the light transmitting member adjacent to one another in a step-wise pyramidal nature;

a light receiver integrally constructed into the light transmitting member including means for receiving light from a light source and directing the received light into at least a first direction within the light transmitting member; and a plurality of first, second and third light reflecting surfaces connecting the adjacent back planar surfaces, each first light reflecting surface receiving a first portion of the light directed in at least the first direction and reflecting the first portion of light towards the substantially planar exit surface where the first portion of light exits the light transmitting member, each second light reflecting surface receiving a second portion of light directed in at least the first direction and redirecting the second portion of light into a second direction, and each third light reflecting surface receiving the light directed in the second direction and reflecting the light received from the second direction towards the substantially planar exit surface where the light received from the second direction exits the light transmitting member.

12. The apparatus set forth in claim 11, wherein the plurality of first and third reflecting surfaces are at 45 degrees to the plurality of planar back surfaces.

13. The apparatus set forth in claim 11, wherein the second plurality of reflecting surfaces are perpendicular to the plurality of planar back surfaces.

14. The apparatus set forth in claim 11, also comprising a light source disposed opposite the light transmitting member from the substantially planar exit surface.

15. The apparatus set forth in claim 11, also comprising a light source disposed adjacent the substantially planar exit surface.

16. The apparatus set forth in claim 11, wherein the light transmitting member has a first center line with which the light transmitting member is symmetrical in at least the first direction.

17. The apparatus set forth in claim 11, wherein the light transmitting member has a second center line with which the light transmitting member is symmetrical in the second direction.

18. The apparatus set forth in claim 11, also comprising a display panel mounted proximate the substantially planar exit surface, the display panel being back-lit by the light transmitting member.

19. The apparatus set forth in claim 11, also comprising a display panel mounted proximate the substantially planar exit surface, the display panel being front-lit by the light transmitting member.

20. The apparatus set forth in claim 11, wherein the light receiver comprises at least one vacuum metalized reflective surface.

21. The apparatus set forth in claim 20, wherein the plurality of first, second and third reflective surfaces are vacuum metalized.

22. The apparatus set forth in claim 20, wherein the entire light transmitting member is vacuum metalized except for the substantially planar exit surface and the means for receiving light from the light source.

23. The apparatus set forth in claim 11, wherein the plurality of first, second and third reflective surfaces are vacuum metalized.

24. The apparatus set forth in claim 11, wherein the entire light transmitting member is vacuum metalized except for the substantially planar exit surface and the light receiver.

* * * * *